United States Patent
McBride et al.

(10) Patent No.: US 7,512,595 B1
(45) Date of Patent: Mar. 31, 2009

(54) METHODS AND SYSTEMS FOR UTILIZING CONFIGURATION INFORMATION

(75) Inventors: Mark A. McBride, Santa Clara, CA (US); John D. Panelli, Campbell, CA (US); Keerthi K. Arutla, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 407 days.

(21) Appl. No.: 11/325,144

(22) Filed: Jan. 3, 2006

(51) Int. Cl.
*G06F 17/30* (2006.01)
(52) U.S. Cl. .................. 707/3; 707/1; 707/2; 707/6; 707/10
(58) Field of Classification Search ............... 707/1–3, 707/6, 10; 709/220, 223
See application file for complete search history.

(56) References Cited

U.S. PATENT DOCUMENTS

| | | | |
|---|---|---|---|
| 6,347,303 B2 * | 2/2002 | Nagai et al. .................. 705/7 |
| 7,191,435 B2 * | 3/2007 | Lau et al. .................. 717/168 |
| 2004/0034577 A1 * | 2/2004 | Van Hoose et al. ............ 705/28 |
| 2006/0085532 A1 * | 4/2006 | Chu et al. .................. 709/223 |

* cited by examiner

*Primary Examiner*—Cam-Linh Nguyen
(74) *Attorney, Agent, or Firm*—Chapin IP Law, LLC

(57) ABSTRACT

A processor (e.g., a search function) searches for particular interoperability records stored in a data structure to identify whether a proposed configuration includes a set of compatible components. For example, a processor receives a query including one or more parameter values identifying a grouping of one or more corresponding unique resources that may or may not be compatible for use in a respective storage area network. Based on receipt of the query, the processor initiates a search with respect to a data structure of interoperability records sorted according to multiple parameter values associated with each respective record. In response to initiating the search, the processor identifies any records in the data structure that include the one or more parameter values identified in the query.

24 Claims, 13 Drawing Sheets

FIG. 5

| | 305-1<br>HOST IDENTIFIER VALUE | 305-2<br>HOST BUS ADAPTER IDENTIFIER VALUE | 305-3<br>SWITCH IDENTIFIER VALUE | 305-4<br>STORAGE ARRAY IDENTIFIER VALUE |
|---|---|---|---|---|
| 120-1 | 101 | 202 | 301 | 401 |
| 120-2 | 102 | 201 | 301 | 401 |
| 120-3 | 102 | 201 | 301 | 405 |
| 120-4 | 102 | 201 | 304 | 401 |
| 120-5 | 102 | 201 | 304 | 405 |
| 120-6 | 102 | 201 | 307 | 401 |
| 120-7 | 102 | 201 | 307 | 405 |
| 120-8 | 102 | 203 | 302 | 402 |
| 120-9 | 102 | 203 | 303 | 405 |
| 120-10 | 102 | 203 | 307 | 401 |
| 120-11 | 103 | 202 | 301 | 403 |
| 120-15 | 103 | 202 | 378 | 403 |
| 120-N | 156 | 203 | 378 | 467 |

400

METHODS AND SYSTEMS FOR UTILIZING CONFIGURATION INFORMATION

RELATED APPLICATION

This application is related to U.S. patent application entitled "METHODS AND SYSTEMS FOR MAINTAINING CONFIGURATION INFORMATION," Ser. No. 11/324,839)), filed on Jan. 3, 2006, the entire teachings of which are incorporated herein by this reference.

BACKGROUND

In general, a so-called storage area network (SAN) is a collection of data storage systems that are networked via a switching fabric to a number of host computer systems operating as servers. The host computers (or servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly for a respective user attempting to retrieve stored data.

One conventional way to ensure that a storage area network will work properly (e.g., so that the storage area network enables users to access corresponding stored data) is to generate a set of interoperability rules indicating valid storage area network configurations and store the interoperability rules in an Oracle database. In general, the set of interoperability rules indicates which combination of different types of hardware and software resources are compatible with each other and can be used together in a respective storage area network.

To ensure that a storage area network configuration is valid, an administrator can review respective interoperability rules prior to modifying a configuration of a respective storage area network. Accordingly, an administrator can be confident that a particular configuration will work prior to actually implementing the respective storage area network configuration.

SUMMARY

As discussed above, management of a storage area network can be a challenge due to the complex network of resources that must be configured so that the storage area network operates properly for a multitude of different types of users. For example, as discussed above, a storage area network typically includes a multitude of storage area network resources (such as respective resources in a path between a host resource and storage array) working in harmony so that a host resource (e.g., server) of the storage area network can access data from the storage arrays on behalf of requesting clients. In certain cases, when even a single resource in the storage area network is not compatible with other resources in a long chain of respective resources, a client in communication with a host resource of the storage area network may not be able to access data in the storage area network.

As discussed above, one conventional way to identify whether a group of resources is compatible for use in a respective storage area network is to query a respective database storing such information and perform a comparison to identify whether a proposed grouping of resources matches a valid resource combination as identified by a respective record in the database. A drawback associated with this conventional way of managing the storage area network is that access to the respective database can be quite slow. Another drawback is that contents of a conventional database storing configuration information cannot be easily searched to identify relevant compatibility information. Accordingly, conventional methods are unacceptable for users that need a quick response indicating whether a respective storage area network configuration is acceptable.

Techniques discussed herein deviate with respect to conventional applications such as those discussed above as well as additional techniques known in the prior art. In particular, certain embodiments herein are directed towards utilization of a data structure that stores a set of interoperability records indicating different combinations of compatible hardware and software resources for use in a respective storage area network. Based on how records are stored in the data structure, the data structure can be easily searched to quickly identify whether a particular specified combination of hardware and software resources is compatible and therefore can be implemented in a respective storage area network without experiencing access errors.

In one embodiment, interoperability records are stored in a data structure depending on numerical identifier values (e.g., parameter values) indicating respective groupings of unique types of resource that can be used in a storage area network. Each of multiple numerical identifier values in a respective record of the data structure maps to a particular manufacturer, model, type, version, etc. of a storage area network resource. Thus a respective record of multiple numerical identifier values or parameter values indicates a specific grouping compatible storage area network resources.

As an example use of the data structure according to a general embodiment herein, a processor (e.g., a search function) searches for particular records stored in the above-described data structure to identify whether a proposed configuration includes a set of compatible components. For instance, in one embodiment, the processor receives a query including one or more parameter values (e.g., numerical identifier values) identifying a grouping of one or more corresponding unique resources that may or may not be compatible for use in a respective storage area network. Based on receipt of the query, the processor initiates a search with respect to the data structure of interoperability records sorted according to multiple parameter values associated with each respective record. One purpose of the search is to identify whether any records in the data structure include the one or more parameter values identified in the query.

As discussed above, in one embodiment, the processor maintains the records in an order depending on respective values of at least a portion of the corresponding parameter values in the records. Each of the multiple parameter values of a respective record in the data structure indicates a corresponding unique type of resource associated with a storage area network configuration identified by the respective record. Consequently, the multiple parameter values in a respective interoperability record of the data structure identify a grouping of compatible resources that can be properly implemented in a storage area network. In response to initiating the search, and since the interoperability records are stored in order according to respective parameter values, the processor can quickly identify a set of one or more interoperability records in the data structure including the one or more parameter values included in the query.

According to one technique herein, a query can include a complete set of parameter values identifying a corresponding grouping of unique resources. In such an instance, if the processor identifies that the data structure includes a respective interoperability record (e.g., a single record) including the complete set of parameter values identified in the query, the processor flags the set of resources identified by the query as a valid storage area network configuration. Otherwise, the processor flags the configuration identified by the complete set of parameter values as being an incompatible grouping of resources or at least one in which the processor is uncertain as to whether the grouping of resources is compatible for use in a respective storage area network.

According to another technique herein, an initial query can include less than a complete set of parameter values identifying a corresponding configuration of unique resources for use in a respective storage area network. In other words, a query can include a respective single parameter value (e.g., a numerical identifier value) identifying a single unique storage area network resource that is potentially part of a valid one or more sets of compatible resources as identified by the records in the data structure. In response to receiving the query, the processor searches for records in the data structure including the respective parameter value received in the query. As will be discussed later in this specification, based on the records in the data structure, the processor identifies other resources or groupings of resources that are compatible with the respective resource identified in the query and populates the respective menus on a display screen.

Techniques herein are well suited for use in applications such as management of storage area networks and specific applications as discussed herein. However, it should be noted that configurations herein are not limited to use in such applications and thus configurations herein and deviations thereof are well suited for other applications as well. For example, each interoperability record stored in the above-mentioned data structure need not identify a valid configuration of respective storage area network resources. Instead, a respective record in the data structure can indicate any grouping of different types of components, items, etc. that are compatible with each other for use in a respective system or application.

Other example embodiments herein include a computerized device (e.g., a processor device, host computer, workstation, etc.) configured to support the techniques disclosed herein to facilitate searching a list of records to identify acceptable (or unacceptable) storage area network configurations. In such embodiments, the computerized device includes sub-components such as a memory system, a processor (e.g., a processing device), a display, and an interconnect. The interconnect enables the processor to access memory and control the display screen. In one embodiment, the memory system is encoded with a management application (e.g., SAN Advisor application) that, when executed on the processor, produces search engine functionality that accesses a respective data structure of interoperability records according to techniques herein.

Yet other embodiments of the present application disclosed herein include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon that can be executed on a computerized device to facilitate searching and general use of interoperability records according to an embodiment herein. The computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for managing configuration information according to an embodiment herein. The instructions, when carried out by a processor of a respective computer device, cause the processor to perform the steps of: i) receiving a query including at least one parameter value; ii) based on receipt of the query, initiating a search in a data structure of records sorted according to multiple parameter values associated with each respective record, each record in the data structure including a grouping of multiple parameter values, each of the multiple parameter values of a respective record in the data structure indicating a corresponding unique type of resource associated with a storage area network configuration identified by the respective record; and iii) in response to initiating the search, identifying a set of at least one record in the data structure including the at least one parameter value included in the query. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present disclosure will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

FIG. 5 is a diagram illustrating a sorted group of interoperability records in tabular form according to an embodiment herein.

DETAILED DESCRIPTION

Figure 1:
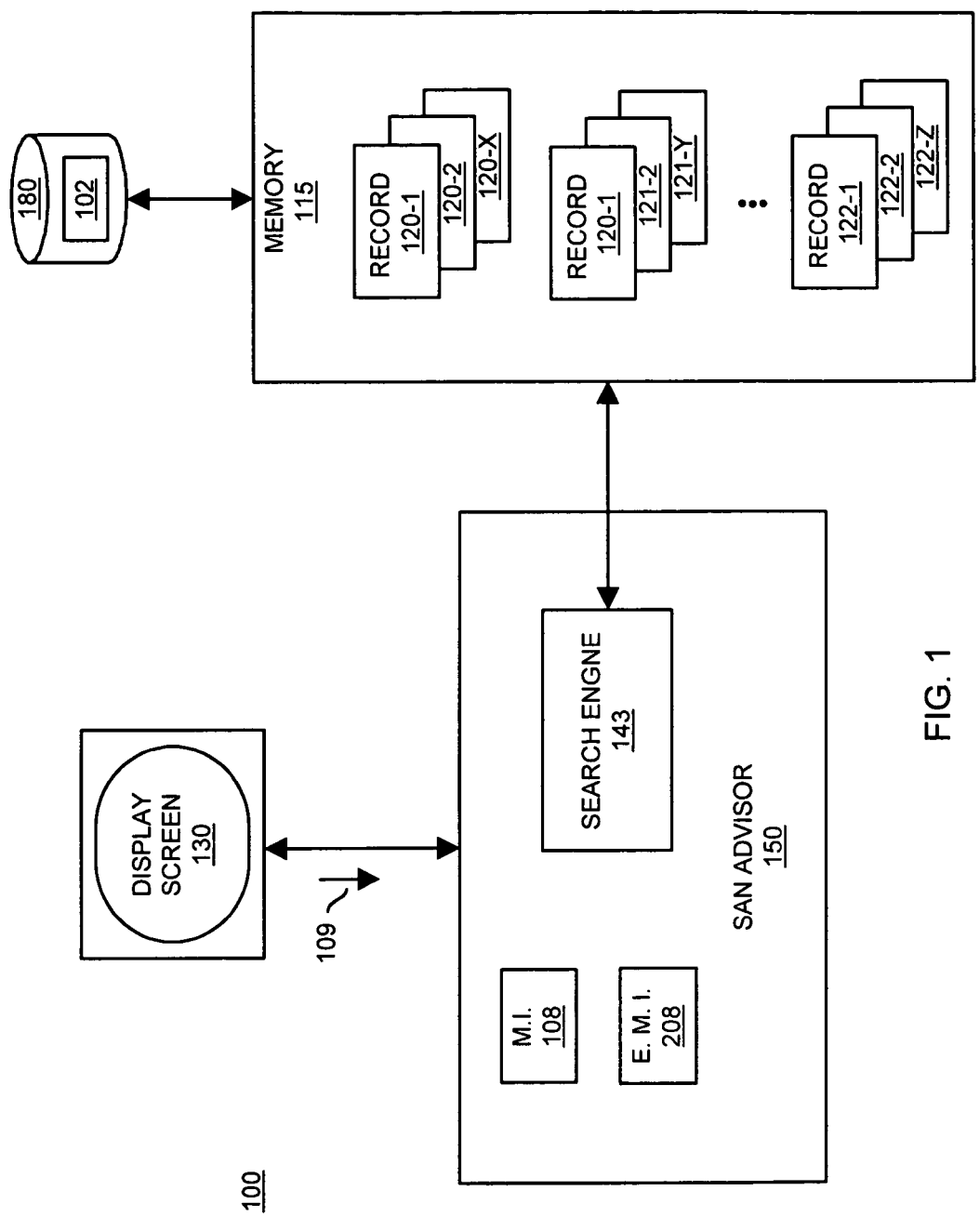
FIG. 1 is a block diagram of a processing environment in which a search engine utilizes records stored in a data structure to identify whether a grouping of components is compatible according to an embodiment herein.

According to one embodiment herein, each record in a respective data structure identifies a group of specific types of compatible storage area network resources. For example, each record in the data structure includes multiple numerical identifier values (a.k.a., parameter values). Each identifier value in a respective record maps to a particular unique type of respective storage area network resource. Consequently, as a whole, a respective record identifies multiple compatible storage area network resources.

For purposes of enabling quick generation of a decision whether a respective configuration is acceptable for use in a storage area network, a processor stores the records in a repository such as memory and maintains the records in an order depending on respective values of the identifiers stored in the records. For example, in one embodiment, the processor sorts the records according to a respective value of a first type of identifier stored in each record such that at least one contiguous subset of records in the set includes a same first identifier value. Additionally, for a respective group of contiguous records having the same first identifier value, the processor sorts the contiguous subset of records in numerical order based on a second type of identifier value in each record of the contiguous set of records, and so on.

In response to receiving one or more queries, a processor (e.g., a search function) searches for particular interoperability records stored in the data structure to identify whether a proposed or existing configuration (as identified by a respective query) includes a set of compatible components. More specifically, according to one technique herein, a processor receives a query including multiple parameter values identifying a grouping of one or more corresponding unique resources that may or may not be compatible for use in a respective storage area network. Based on receipt of the query, the processor initiates a search with respect to the data structure for interoperability records that include each of the parameter values identified in the query. If the search engine identifies a record that includes a set of identifiers that match the parameter values in the query, the search engine provides a respective notification that the combination of resources identified by the query are compatible for use in a respective storage area network.

According to another technique herein, an initial query can include less than a complete set of parameter values identifying a corresponding configuration of unique resources for use in a respective storage area network. In other words, a query can include a respective single parameter value (e.g., a numerical identifier value) identifying a single unique storage area network resource that is potentially part of a valid one or more sets of compatible resources as identified by the records in the data structure. In response to receiving the query, the processor searches and retrieves a group of records in the data structure including the respective parameter value received in the query. In one embodiment, the processor receives a query including the single parameter value in response to a user selecting a resource from a first menu on a display screen. Based on searching the data structure as discussed above and identifying other corresponding compatible resources in the group of records, the processor populates a second menu (and other menus) on the display screen with a listing of respective resources that are potentially compatible with the resource selected from the first menu.

FIG. 1 illustrates an environment 100 suitable for explaining an operation of example embodiments herein. As shown, environment 100 includes display screen 130, repository 180 (e.g., an Oracle™ database), SAN Advisor 150, and memory 115 (e.g., a high speed storage mechanism such as a cache). SAN Advisor 150 utilizes search engine 143 and mapping information 108 and equivalency mapping information 208 to carry out respective searches in response to receiving query 109. Repository 180 stores interoperability rules 102. Memory 115 stores set of records 120, set of records 121, and set of records 123. Set of records 120 includes record 120-1, record 120-2, . . . and record 120-X. Set of records 121 includes record 121-1, record 121-2, . . . and record 121-Y. Set of records 122 includes record 122-1, record 122-2, . . . and record 122-Z.

In the example embodiment shown, the interoperability rules 102 in repository 180 as well as records in memory 115 identify different valid combinations of resources that can be used in a respective storage area network. However, according to another embodiment herein, note that the set of interoperability rules 102 and records in management entity 115 can identify unacceptable combinations of resources that, if used in a respective storage area network, would result in data access errors due to equipment incompatibility.

As discussed briefly above, one purpose of the techniques herein is to enable a storage area network administrator (that generates query 109) to more quickly obtain a result as to whether a specific combination of resources (as identified in query 109) are compatible and thus can be used in a respective storage area network environment. An inquiry or query 109 provided by the network administrator (or other entity) can be based on a current configuration (or incremental changes to a set) of resources already deployed in a respective storage area network or a theoretical model of a set of resources that have not yet been used in the storage area network.

The information stored in records 120, 121, and 122 provide a easily searched information that is used as a basis for determining whether a group of specified resources (e.g., either a current storage area network configuration or a modeling of a storage area network configuration) is compatible with each other for use in a respective storage area network. As discussed, and as will be further discussed later in this specification, accessing and searching set of records 120, set of records 121, . . . and set of records 122 stored in memory 115 is relatively fast compared to accessing and searching interoperability rules 102 stored in a database to determine whether a respective configuration is acceptable.

In any event, prior to processing a respective query 109 and generating an indication of whether a combination of storage area network resources is acceptable or not, a conversion process as further described in related U.S. patent application entitled "METHODS AND SYSTEMS FOR MAINTAINING CONFIGURATION INFORMATION," Ser. No. 11/324,839), converts interoperability rules 102 in repository 180 into easily searched sets of records stored in memory 115. Note that each set of the records can pertain to a different type of compatibility check. For example, set of records 120 (e.g., an array of records) can be utilized to identify acceptable base connectivity resource configurations; set of records 121 (e.g., another array of records) can identify acceptable fiber channel connectivity resource configurations; set of records 122 (yet another array of records) can identify acceptable cluster configurations, and so on.

Note that a proposed storage area network configuration can be checked against multiple sets of records to identify whether the proposed configuration includes a compatible set of resources that can be properly deployed in a respective storage area network. For example, if the proposed configuration does not pass one or more of the compatibility checks against a respective set of records, then the proposed configuration is not acceptable for use in a respective storage area network environment.

According to one embodiment, the conversion process as discussed above includes retrieving a respective interoperability rule 102 from repository 180. The retrieved interoperability rule 102 identifies a valid combination of resources that can be used in the storage area network. For example, a corresponding interoperability rule 102 can identify a compatible set of resources including a host, host bus adapter, switch, and storage array for use in a respective storage area network. In this example, each record in set of records 120 can identify a valid combination (or combinations) of these types of resources.

As another example, another type of one or more interoperability rules 102 can identify a compatible set of resources including an operating system, a host computer, switch, and storage array for use in a respective storage area network. Each record in set of records 121 can identify a valid combination (or combinations) of these types of resources, and so on.

As discussed above, and as more particularly shown in the following FIGS. 2-5, numerical values in respective records stored in memory 115 map to a specific combination (or combinations) of compatible storage area network resources that can be properly deployed in a respective storage area network environment. After discussing contents of the following FIGS. 2-5, this specification will continue discussing operations supported by SAN Advisor 150 as shown in FIG. 1.

Figure 2:
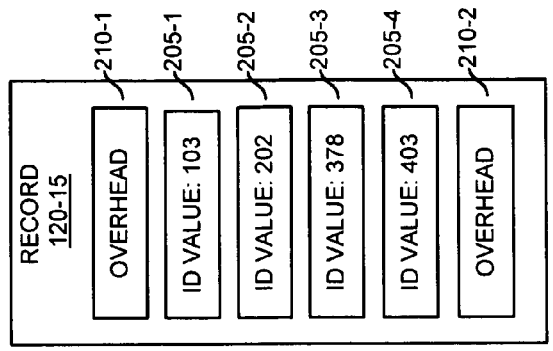
FIG. 2 is a diagram illustrating use of equivalency techniques to convert an interoperability rule into a respective interoperability record according to an embodiment herein.

FIG. 2 is a diagram more particularly illustrating a technique of how interoperability rules 102 are converted and maintained as respective records 120 according to an embodiment herein. For example, as shown, the interoperability rule 102-15 identifies specific combinations of unique resources that are compatible for use in a respective storage area network. Corresponding record 120-15 identifies the same combinations of resources using integer values identified in mapping information 108. However, the record 120-15 is stored in memory 115 for quick searching.

More specifically, in the present example, record 120-15 identifies certain combinations of host type, host bus adapter type, switch type, and storage array type that are compatible for use in a respective storage area network. Equivalency mapping information 208 defines which range of resource types can be used with a respective combination of other resources. For example, record 120-15 (as well as interoperability rule 102-15) indicates that a host such host computer type 3 (e.g., numerical identifier value 103), host bus adapter type 2 (e.g., numerical identifier value 102), storage array type 3 (e.g., numerical identifier value 403), in combination with any one of switch types 1 through 7 (e.g., numerical identifier value 378) are valid combinations of resources for use in a respective storage area network environment. In other words, there are seven acceptable combinations of resources for use in a respective storage area network as identified by respective record 120-15, which include:

i) host computer type 3, host bus adapter type 2, switch type 1, and storage array type 3, ii) host computer type 3, host bus adapter type 2, switch type 2, and storage array type 3, iii) host computer type 3, host bus adapter type 2, switch type 3, and storage array type 3, iv) host computer type 3, host bus adapter type 2, switch type 4, and storage array type 3, v) host computer type 3, host bus adapter type 2, switch type 5, and storage array type 3, vi) host computer type 3, host bus adapter type 2, switch type 6, and storage array type 3, vii) host computer type 3, host bus adapter type 2, switch type 7, and storage array type 3.

Use of equivalency mapping information 208 can substantially reduce the number of records that must be stored in memory 115. One benefit of reducing the number of records using equivalency information is the savings of memory 115. Another benefit of reducing the number of records is increased searching speed and generation of a decision whether a respective configuration is acceptable or not for use in a respective storage area network.

In one embodiment, the combinations of valid resources as identified by corresponding interoperability rules 102 and records 120 are pre-tested by a quality assurance group to ensure that such combinations of different types of resources as specified by interoperability rule 102 and records will work in the field. After testing and validation, the quality assurance group pre-testing this combination generates the interoperability rules 102 (a.k.a., one or more CSST or Configuration Support Statements) indicating one or more respective combinations of resources that are valid for use in a respective storage area network application.

Figure 3:
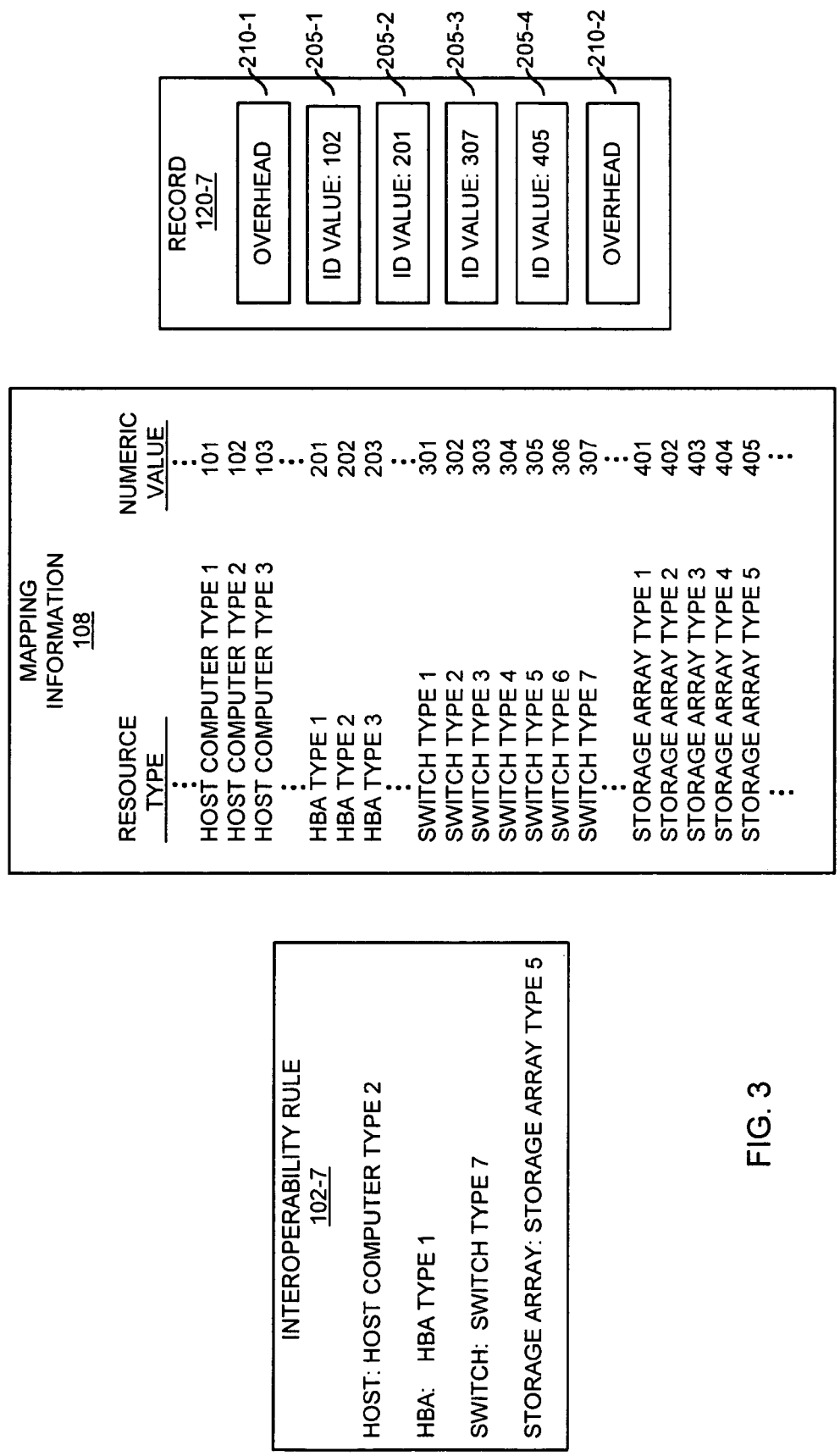
FIG. 3 is a diagram illustrating use of mapping information to convert an interoperability rule into a respective interoperability record according to an embodiment herein.

FIG. 3 is a diagram illustrating that a record 120-7 can identify a single combination of acceptable resources for use in a respective storage area network according to an embodiment herein. For example, as shown, record 120-7 identifies that a combination of host computer type 2 (e.g., as identified by numerical identifier value 102), host bus adapter type 1 (e.g., as identified by numerical identifier value 201), switch type 7 (e.g., as identified by numerical identifier value 307), and storage array type 5 (e.g., as identified by numerical identifier value 405) are compatible for use in a respective storage area network environment.

Figure 4:
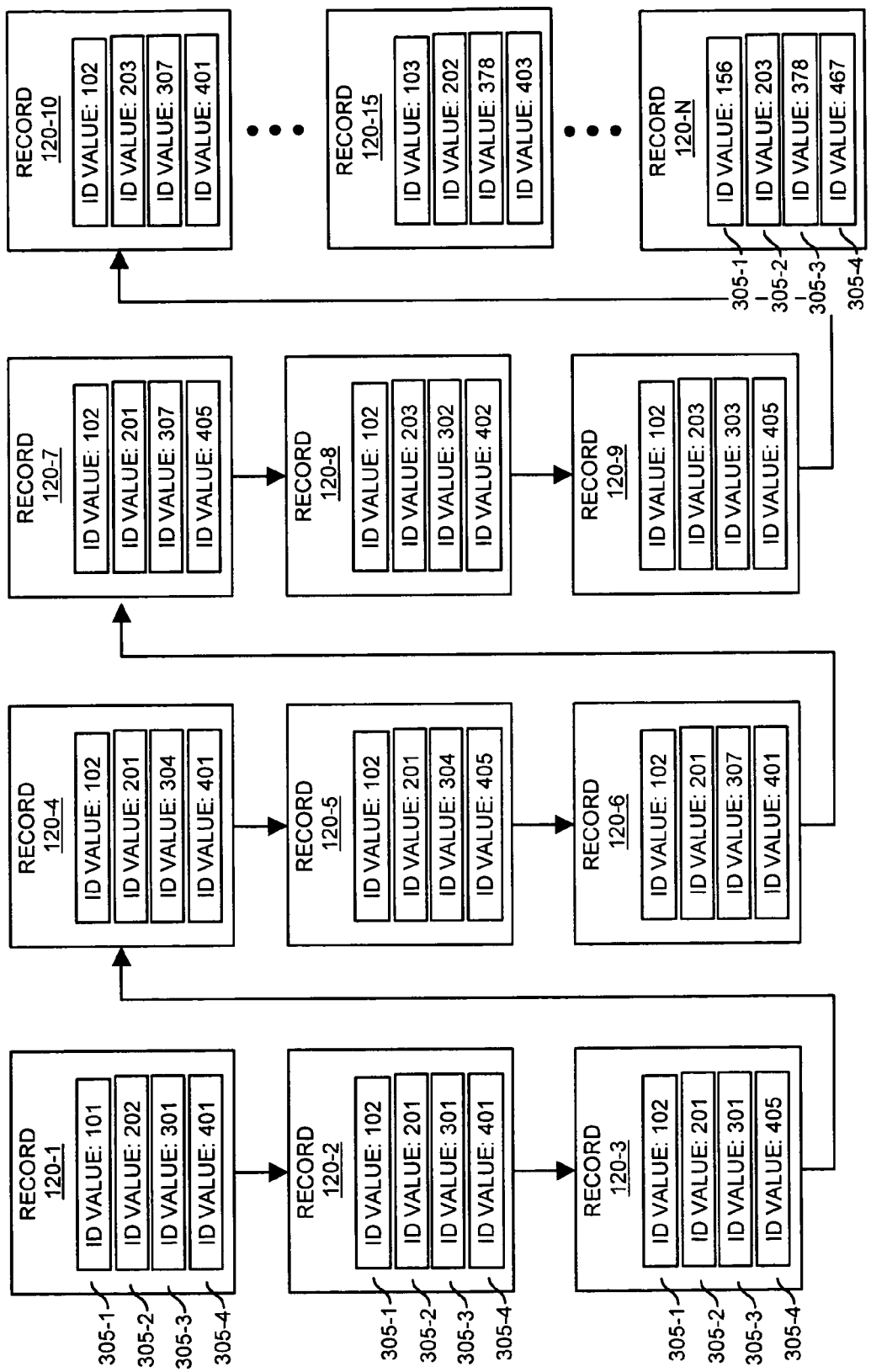
FIG. 4 is a diagram illustrating a sorted group of interoperability records according to an embodiment herein.

FIG. 4 is a diagram illustrating an example set of records 120 (e.g., a data structure of configuration information) stored in memory 115 according to an embodiment herein. As discussed above, one purpose of generating and storing records 120 in the manner as shown in FIG. 4 is to enable binary searching in an array or set of records for a valid combination of compatible resources and thus quick generation of a decision whether a respective configuration is acceptable for use in a storage area network.

As shown, set of records 120 are sorted in an order depending on respective values of the numerical identifier values stored in the set of records 120. For example, a sorting mechanism (e.g., a processor) sorts the set of records 120 in a sequential order such that the array of records 120 ranges from a first record 120-1 having a lowest first respective numerical value for the first type of identifier 305-1 to a last record 120-N having a highest first respective numerical value for the first type of identifier 305-1.

Note that multiple records stored in memory 115 can include a same value for the first type of identifier 305-1. In the example as shown in FIG. 4, the contiguous set of records including record 120-2, record 120-3, record 120-4, record 120-5, record 120-6, record 120-7, record 120-8, record 120-9, and 120-10 each store the same integer value of 102 for the first type of identifier 305-1. In such a case, for this contiguous set of records having the same first respective identifier value of 102, the sorting mechanism further sub-sorts and stores the records based on respective values of a second identifier type 305-2. For example, the sorting mechanism sorts the contiguous group of records (e.g., record 120-2 to record 120-10 described above) such that the contiguous group of records in the array ranges from a record 120-2 having a lowest second respective numerical value 305-2 (e.g., numerical identifier value 201) to a last record 120-10 having a highest second respective numerical value 305-2 (e.g., numerical identifier value 203). In a similar way as discussed above for the first identifier value 305-1, a portion of the contiguous subset of records can have the same second respective identifier value 305-2. This process of sub-sorting can be repeated for each successive lower level of identifier values associated with the set of records 120 as shown in FIG. 4. Note that other sets of records (e.g., set of records 121, set of records 122, etc.) can be sorted in a similar way.

FIG. 5 is a diagram illustrating a sorted set of records 120 (e.g., a data structure of information) displayed in tabular form according to an embodiment herein. As shown, table 400 includes the data for each of multiple records 120 (as in FIG. 4) but in tabular form including columns and rows. The records 120 are sorted according to unique numerical identifier values in the first column (e.g., host identifier value) of table 400. As previously discussed, the records 120 including a common first identifier value are sub-sorted according to unique numerical identifier values in the second column (e.g., host bus adapter identifier value) of table 400, and so on.

Referring again now to FIG. 1, query 109 can include a full set of respective parameter values identifying a specific storage area network configuration. In one embodiment, a user generates the query to learn whether the specific storage area network configuration is acceptable for use in a respective storage area network environment managed by the user.

Upon receiving the query 109, the search engine 143 of SAN Advisor 150 maps (if necessary) each resource identified in the query 109 to a corresponding numerical identifier value via use of mapping information 108 and equivalency mapping information 208. In the current example, assume that each parameter value in the query 109 identifies only a single corresponding resource type rather than a range of different types of resources. Thus, equivalency mapping information 208 is not used in this example. Accordingly, the query 109 specifies only a single combination of resources for use in a respective storage area network.

In this first example, suppose that query 109 a resource combination including host computer type 2, host bus adapter type 1, switch type 1, and storage array type 5. If not already done so, the search engine 143 maps these resources to respective numerical identifier values 102, 201, 301, 405 and initiates a search with respect to set of records 120 stored in memory 115.

In one embodiment, to determine whether the combination (identified by query 109) is acceptable, the search engine 143 initiates a binary search including a combination of all numerical identifier values 102, 201, 301, 405 to identify whether this is a valid combination. For example, the search engine 143 initially selects a single record in the set of records 120 such as a record at the midpoint of the set of records 120. If there is an immediate match of the numerical identifier values in the query 109 and this first selected record (e.g., the midpoint record), then the search engine 143 knows that the combination is valid and the search terminates. If not, the search engine 143 compares (from left to right) each of the numerical identifier values in the query 109 with the first selected record to determine whether a potential target record (including numerical identifier values 102, 201, 301, 405) would reside before or after the first selected record (e.g., the midpoint record in the set of records 120). Recall again that the records are sorted according to numerical identifier values as previously discussed so it is possible to determine whether a target record would reside before or after a selected record based on the above comparison.

Assume that no match has been found yet in the current example based on the first selected record. In such a case, the search engine 143 would then repeat steps of selecting a record at the midpoint of either the first half of the set of records or the second half of set of records 120 depending on whether the previous comparison indicates that the target record would be before or after the first selected record. If there is a match of the numerical identifier values in the query 109 and the second selected record, then the search engine 143 knows that the combination is valid and the search terminates. If not, the search engine 143 compares (from left to right) each of the numerical identifier values in the query 109 with the selected record to determine whether the potential target record (including numerical identifier values 102, 201, 301, 405) would reside before or after the second selected record. This binary search process of narrowing a selected search region in half is repeated until the search engine 143 identifies whether the combination identified by the query 109 resides in one of the records stored in set of records 120.

In an alternative embodiment, the search engine 143 can initiate a multi-dimensional search (e.g., multiple binary searches or a piece-meal search) to identify whether the storage area network configuration (e.g., as identified by 102, 201, 301, 405) is acceptable for use in a respective storage area network environment. Note that the following discussion will reference content shown in and previously discussed with respect to FIGS. 4 and 5.

A first dimension of the multi-dimensional search by search engine 143 includes performing a binary search for records 120 in memory 115 having a first type of identifier 305-1 matching the numerical identifier value 102 in a corresponding record. This is done in order to identify which records in memory 115 include a first parameter value (e.g., numerical identifier value 102) as identified by the query 109. In this example, the search engine 143 identifies that record 120-2 through record 120-10 in memory 115 each include the numerical identifier value 102. For this contiguous set of records, the search engine 143 initiates another search (e.g., a second dimension of the search) to identify which of the records including the first parameter of 102 also includes a second parameter value, which is identified as 201 in the query 109. In this case, the search engine 143 identifies that record 120-2 through record 120-7 each include the numerical identifier value of 201. For this contiguous set of records, the search engine 143 initiates another search (e.g., a third dimension of the search) to identify which of the records including the first parameter of 102 and the second parameter value of 201 also includes a third parameter value, which is identified as 301 in the query 109. In this case, based on another binary search, the search engine 143 identifies that record 120-2 and record 120-3 each includes the numerical identifier value of 301. For this contiguous set of records, the search engine 143 initiates another search (e.g., a fourth dimension of the search) to identify which of the records including the first parameter of 102, the second parameter value of 201, and the third parameter value of 301 also includes a fourth parameter value, which is identified as 405 in the query 109. In this case, based on yet another binary search, the search engine 143 identifies that record 120-2 includes the numerical identifier value of 301. In response to identifying a record in memory 115 including all of the parameter values identified in the query 109 using either of the above methods, the search engine 143 of SAN Advisor 150 provides a notification (e.g., via display screen 130) that the configuration identified by the query is acceptable for use in a respective storage area network environment. Note that if the combination of resources could not be found in the set of records 120, then the SAN Advisor 150 would notify the user (e.g., via display screen 130) that the configuration identified by the query is not a valid combination of resources for use in a respective storage area network environment.

The above example illustrates a case in which a respective record (e.g., record 120-2) in memory 115 does not include equivalency information. That is, relevant records 120 in memory 115 do not include any entries identifying a range of different resource types. For the following example, assume that the user initiates a respective query 109 whether a combination including host computer type 3, host bus adapter type 2, switch type 302, and storage array type 3 is acceptable for use in a respective storage area network environment. In this case, the search engine 143 could perform a similar multi-dimensional search as discussed above to learn that there is no record including a corresponding combination of numerical identifier values including 103, 202, 302, and 403. However, learning that memory 15 does not contain a record with these specific numerical identifier values does not necessarily indicate that the configuration is not valid. For example, a record in memory 115 can include equivalency information identifying that this actually is a valid configuration.

In this example, because there is no record including the combination 103, 202, 302, and 403, the search engine 143 checks equivalency mapping information 208 to identify whether the resources identified in the query 109 fall into a respective range of different types of resources. Based on such an inquiry of equivalency mapping information 208, the search engine 143 identifies that numerical identifier value 103 is included in a grouping of resources identified by numerical identifier value 188 and that numerical identifier value 302 is included in a grouping of resources identified by numerical identifier value 378.

In a similar manner as discussed above, the search engine 143 then initiates respective multi-dimensional searches to identify any records including the combination 103, 202, 378, 403 or the combination 188, 202, 302, 403 or combination 188, 202, 378, 403 because it is uncertain how the record would be stored in memory 115. In this example, based on the binary search techniques as discussed above, assume that the search engine 143 identifies a match of the above combinations with respect to only record 120-15. In other words, record 120-15 includes the combination 103, 202, 378, 403. The combination identified by record 120-15 includes corresponding valid combinations of: [103, 202, 301, 403], [103, 202, 302, 403], [103, 202, 303, 403], [103, 202, 304, 403], [103, 202, 305, 403], [103, 202, 306, 403], [103, 202, 307, 403]. Accordingly, record 120-15 indicates that the combination 103, 202, 302, and 403, in the respective query is a valid combination for use in a respective storage area network environment.

Accordingly, as discussed above, one technique herein involves (based on receiving a query 109 in response to an entity inquiring whether a storage area network configuration including respective resources identified by the at least one parameter value is acceptable for use in a respective storage area network environment) mapping a first parameter value (e.g., numerical identifier value 302) of a query 109 into a second parameter value (e.g., numerical identifier value 378). As discussed above, the first parameter value of 302 in the query 109 identifies a single corresponding unique type of storage area network resource. The second parameter value of 378 identifies a range of different unique types of storage area network resources. The search engine 143 identifies a matching record in the data structure including the second parameter value of 378 and thereafter provides notification that a respective storage area network configuration is acceptable based on identifying the matching record (e.g., record 102-15) in memory 115 corresponding to the query 109 even though the matching record 102-15 in memory 115 does not include the first parameter value of 302 but does include the second parameter value of 378.

One purpose of performing the above search is to determine whether a respective portion of a given storage area network configuration, as identified by respective numerical identifier values in the query 109, is acceptable for use in a corresponding storage area network environment. Note that a query may pertain only to a portion of a respective storage area network because an actual storage area network configuration may include many more resources than as specified by a respective query 109. As previously discussed, multiple queries and respective searches can be performed to check whether an overall storage area network configuration is acceptable.

One way of providing notification whether a configuration is valid for use in a respective storage area network environment is to generate a diagram (e.g., on display screen 130) of the given storage area network configuration including corresponding storage area network resources. The SAN Advisor 150, based on initiation of searches and corresponding techniques as discussed above, relies on results of the search engine 143 to identify whether the given storage area network configuration in the diagram is acceptable. That is, for portions of the given storage area network configuration that the search engine 143 finds unacceptable, the SAN Advisor 150 marks the diagram with indicators to identify one or more incompatible storage area network resources. Thus, in one embodiment, the SAN Advisor 150 provides notification in respective storage area network topology diagram that a combination of resources identified by the one or more parameter values in a query do not match any records in memory 115.

Figure 6:
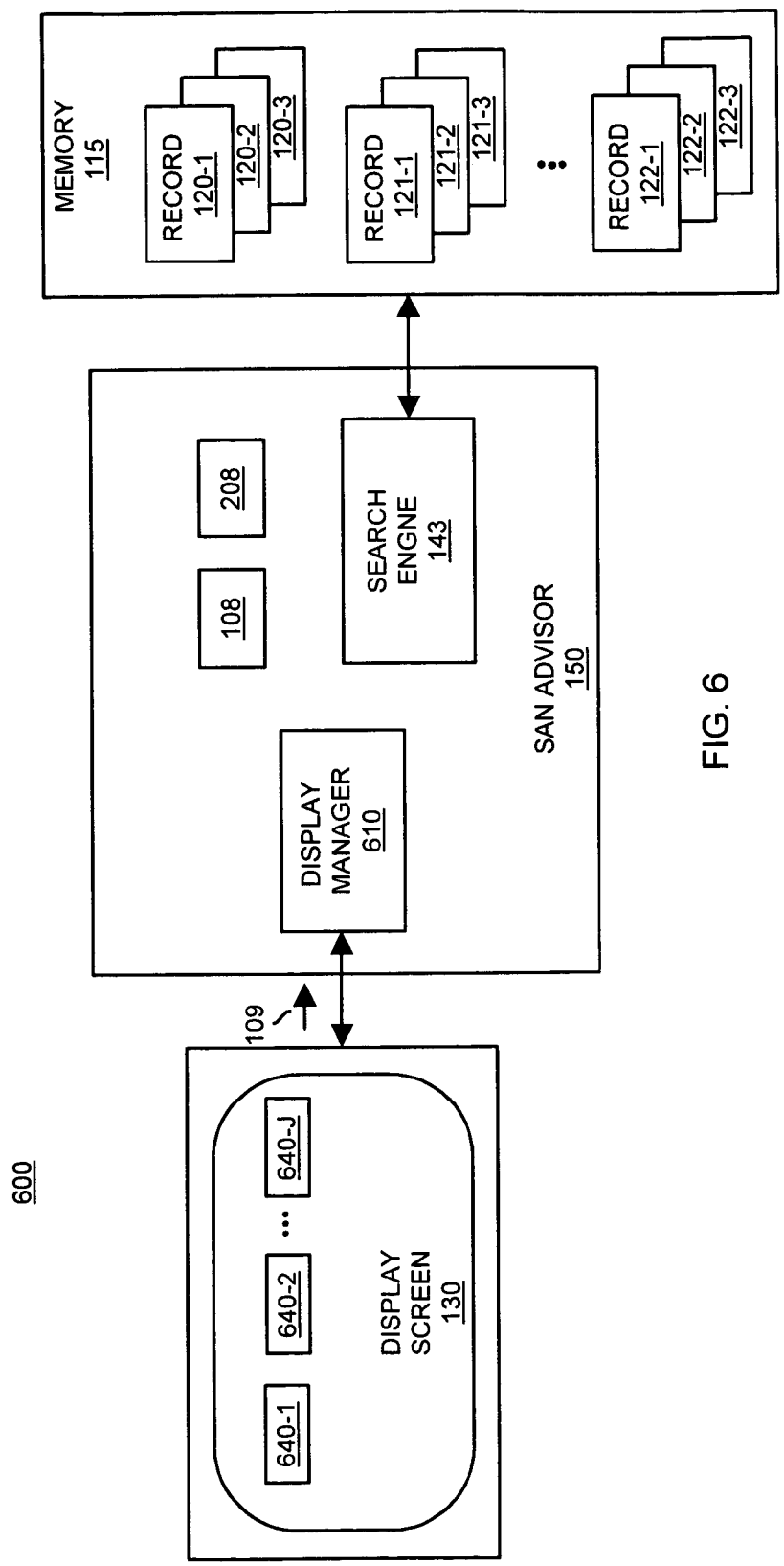
FIG. 6 is a diagram of a computing environment enabling a respective user to select items from a menu to identify a valid combination of resources according to an embodiment herein.

FIG. 6 is a diagram illustrating a SAN Advisor 150 that populates a series of menus 640 with resource information according to an embodiment herein. As shown, storage area network management environment 600 includes display screen 130, SAN Advisor 150, and memory 115. SAN Advisor 150 includes display manager 610, search engine 143, mapping information 108, and equivalency mapping information 208. Memory 115 stores set of records 120, set of records 121, and set of records 122. Display screen 130 displays respective menu 640-1, menu 640-2, . . . menu 640-J (collectively, menus 640).

In general, a user interacts with display screen 130 to identify whether a proposed configuration of storage area network resources (as identified by resources selected from menus 640) are compatible for use in a respective storage area network environment. For example, display manager 610 initially displays a corresponding set of selectable storage area network resources in each of the menus 640 on display screen 130. The initially displayed set of resources in the menus represents all different types of resources that can be used in a respective storage area network environment.

A user viewing display screen 130 selects resources in one or more of the menus 640. Each time a user selects a resource from a respective one of the menus 640, the SAN Advisor 150 utilizes search engine 143 to search records in memory 115 and identify other compatible resources that potentially can be use in conjunction with a resource selected from one of the menus 640. In other words, the SAN Advisor 150 reduces the number of resources displayed in the other menus 640 depending on which resource is selected from one of the menus 640 so that a user can be steered into selecting a valid configuration based on selection of a single resource form each of the menus 640.

Figure 7:
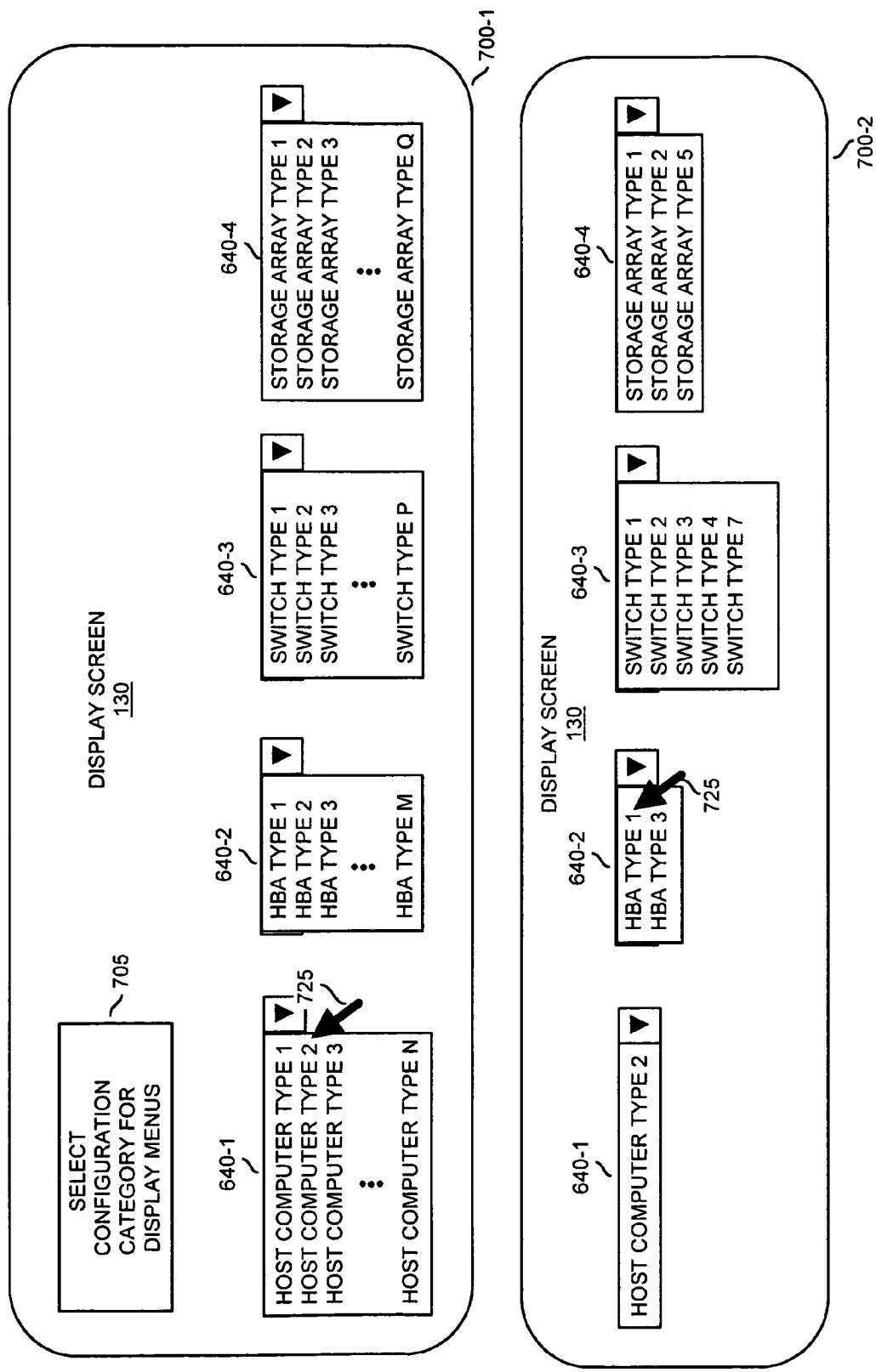
FIGS. 7 and 8 illustrate a series of screenshots including menus populated with resource information according to embodiments described herein.
Figure 8:
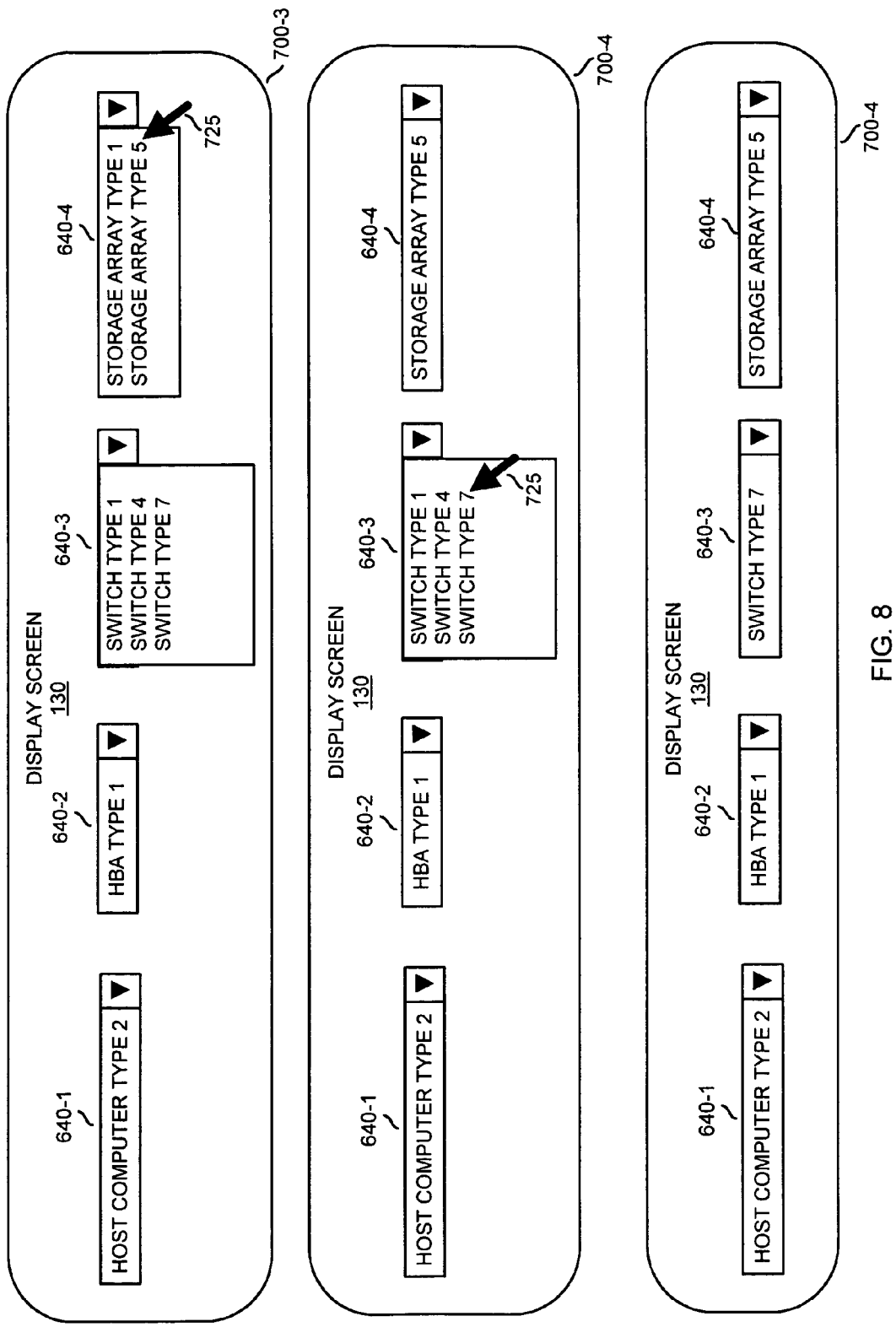

As an example, FIGS. 7 and 8 include screenshots of a graphical user interface on display screen 130 that change depending on selection from a respective user. For example, a user initially provides input to display region 705 of screenshot 700-1 in order to select a configuration category for menus 640. Selection of a respective configuration category dictates which set of records in memory shall be used in a respective search. Examples of the different types of checks or configuration categories include base connectivity, fiber channel connectivity, cluster connectivity, etc.

Depending on which configuration category is selected by the user, display manager 610 populates respective menus 640-1 with different types of resource information. For example, in the example shown, assume that the user selects base connectivity as a configuration category from a respective mode selection field such as display region 705. In response to this selection, display manager of SAN Advisor 150 displays: menu 640-1 to include different types of host computers, menu 640-2 to include different types of host bus adapters, menu 640-3 to include different types of switches, and menu 640-4 to include different types of storage arrays. Selection of a different type of configuration category in display region 705 would prompt the display manager 610 to display other types of resources in the menus 640.

In the current example, after selection of a respective category in display region 705, the SAN Advisor 150 searches a respective set of records 120 in memory to identify all of the resources identified by a combination of all records. For records utilizing equivalency information (e.g., ranges of valid resources rather than a single resource type), the SAN Advisor 150 utilizes equivalency mapping information 208 and expansion techniques to identify which specific types of resources are identified by the records 120 as previously discussed. Via the display manager 610, the SAN Advisor 150 initiates populating menus 640 with corresponding resource information as shown in screenshot 700-1 of FIG. 7.

Assume in the current example that a respective user selects host computer type 2 in menu 640-1 via use of pointer 725. In one embodiment, the user controls movement and functionality associated with pointer 725 via a mouse device.

Upon selection of host computer type 2 in menu 640-1, the SAN Advisor 150 receives an indication (e.g., a query) that host computer type 2 has been selected in menu 640-1. If necessary, the SAN Advisor 150 converts the host computer type 2 into a corresponding numerical identifier value of 102 via use of mapping information 108. Thereafter, the SAN Advisor 150 utilizes search engine 143 (e.g., via a binary search) to identify any records in memory 115 that pertain to a valid resource combination including the host computer type 2 as identified by numerical identifier value 102. This process can include the technique of "exploding" a record (that includes equivalency information) into each of its valid combinations as discussed above and then identifying new respective subsets of resources (for each of menu 640-2, menu 640-3, and menu 640-4) that potentially can be used with the resource (e.g., host computer type 2) selected from the first menu 640-1. In this example, based on selection of host computer type 2 in menu 640-1, the search engine 143 identifies that record 120-2 through record 120-10 each include the numerical identifier value 102 as the first identifier type 305-1 as shown in FIGS. 4 and 5.

The search engine 143 then searches this group of records to identify and collect identifications of other potentially compatible resources that could be combined with the host computer type 2 identified by numerical identifier value 102. For example, the search engine 143 identifies a grouping of numerical identifier values 201 and 203 for host bus adapter types that potentially can be combined with the host computer type 2 selected from the menu 640-1. The search engine 143 identifies numerical identifier values 301, 302, 303, 304, and 307 as for switch identifier types. Finally, the search engine 143 identifies numerical identifier values 401, 402, and 405 as storage array types.

In response to selection of the resource from menu 640-1 and after the above described search, the SAN Advisor 150 initiates modification of resources shown in menu 640-2, menu 640-3, and menu 640-4 as shown in screenshot 700-2 of FIG. 7. For example, the display manager 610 populates menu 640-2 to include host bus adapter type 1 (e.g., as identified by numerical identifier value 201) and host bus adapter type 3 (e.g., as identified by numerical identifier value 203). Additionally, the display manager 610 populates menu 640-3 to include switch type 1 (e.g., as identified by numerical identifier value 301), switch type 2 (e.g., as identified by numerical identifier value 302), switch type 3 (e.g., as identified by numerical identifier value 303), switch type 4 (e.g., as identified by numerical identifier value 304), and switch type 7 (e.g., as identified by numerical identifier value 307). Finally, the display manager 610 populates menu 640-4 to include storage array type 1 (e.g., as identified by numerical identifier value 401), storage array type 2 (e.g., as identified by numerical identifier value 402), and storage array type 5 (e.g., as identified by numerical identifier value 405). These newly displayed resources in the menu represent resources that potentially can be further selected by a respective user and combined with the first selected resource to create a valid combination of storage area network resources via selection from the menus 640.

As further shown in screenshot 700-2, a user selects host bus adapter type 1 from menu 640-2. In response to this selection, the search engine 143 searches set of records 120 to identify a corresponding group of records including numerical identifier value 102 and numerical identifier value 201 in a similar manner as discussed above. In this instance, search engine 143 identifies that record 120-2 through record 120-7 include such numerical identifier values and thus populates menu 640-3 with switch type 1, switch type 4, and switch type 7 and menu 640-4 with storage array type 1 and storage array type 5 as shown in screenshot 700-3 of FIG. 8. As discussed above, the resources displayed in menu 640-3 and menu 640-4 represent a respective set of resources that potentially can be selected as a result of making the selection of resources in menu 640-1 and menu 640-2 to produce a valid combination of storage area network resources.

As shown in screenshot 700-3 of FIG. 8, a user need not select from the menus 640 in sequential order as they appear on the display screen 130. For example, for the next selection, the user can use pointer 725 to select storage array type 5 in menu 640-4. In this instance, the search engine 143 searches for records in memory 115 including numerical identifier values 102, 201, and 405. According to one embodiment herein, the search engine 143 utilizes a linear search to identify which remaining records include these numerical identifier values. Note that selection of storage array type 5 in menu 640-4 reduces a relevant grouping of records as shown in FIG. 5 down to record 120-3, record 120-5, and record 120-7. Note in this example that selection of storage array type 5 in menu 640-4 of screenshot 700-3 does not cause a reduction of resources in menu 640-3 as shown in screenshot 700-4 of FIG. 8.

As a final input shown in screenshot 700-4, a user selects switch type 7 in menu 640-3 via pointer 725. This selection prompts the display manager 610 of SAN Advisor 150 to display a valid grouping of resources in the menus 640 that can be used in a respective storage area network environment as shown in screenshot 700-5. Based on the above technique, a SAN Advisor 150 can steer a respective user into selecting a valid grouping of compatible storage area network resources by limiting the menus 640 to display only relevant resources depending on each successive selection from the menus 640.

Figure 9:
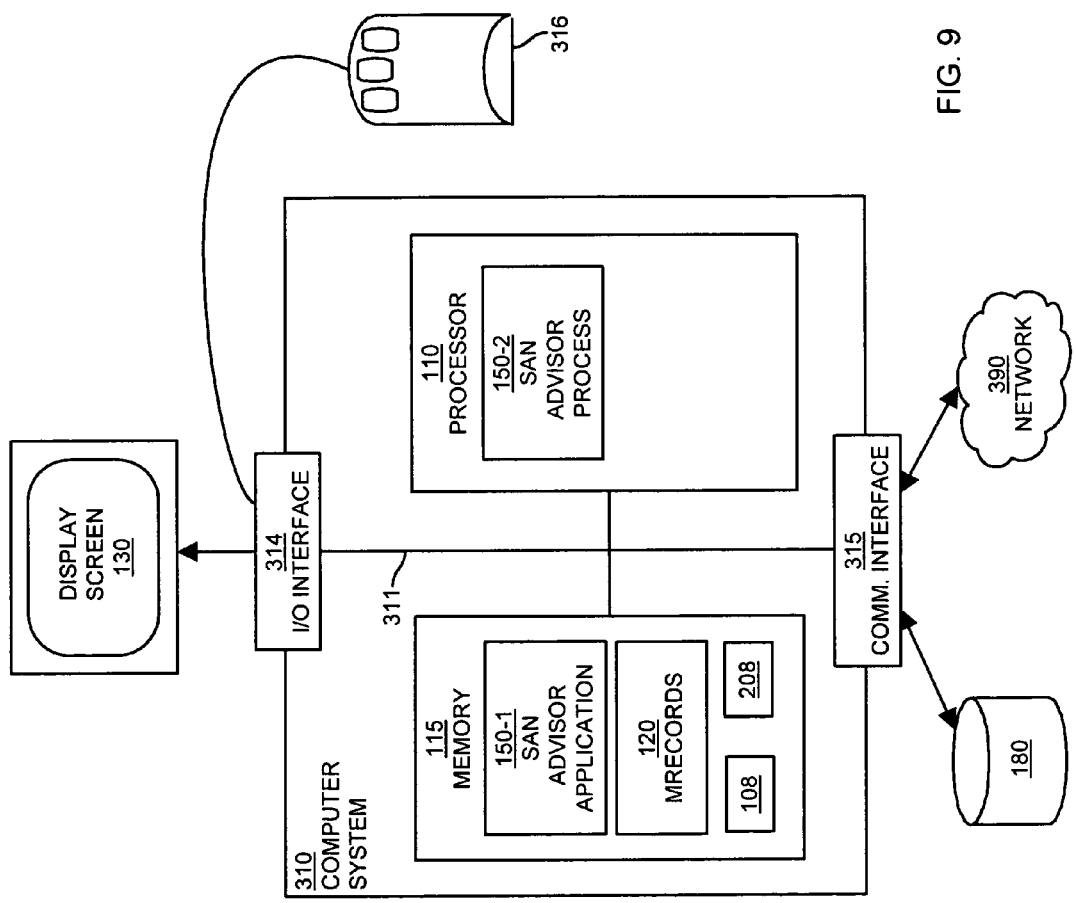
FIG. 9 is a diagram of a sample computing environment for executing a respective SAN Advisor application according to an embodiment herein.

FIG. 9 is a block diagram illustrating an example architecture of computer system 310 (e.g., a storage area network management station) according to an embodiment herein. Computer system 310 may be a digital processing device such as a personal computer, workstation, portable computing device, console, laptop, network terminal, etc.

As shown, computer system 310 of the present example includes an interconnect 311 that couples a memory system 115, a processor 110, an input/output interface 314, and a communications interface 315. Peripheral device 316 (e.g., one or more viewer controlled devices such as a keyboard, mouse, etc.) as well as display screen 130 couple to computer system 310 through I/O interface 314 and enable a respective user to provide input commands and thus generally control functions associated with SAN Advisor application 150-1. As discussed above, repository 180 stores interoperability rules 102 identifying compatible groups of resources for use in a respective storage area network. Communications interface 315 enables processor 110 of computer system 310 (and corresponding user 108) to communicate with other devices such as repository 180 and other entities over network 390.

As shown, memory 115 is encoded with SAN Advisor application 150-1 processes configuration information (e.g., records) associated with respective storage area network resources as discussed herein. Additionally, memory 115 stores mapping information 108, equivalency mapping information 208, and records 920. In one embodiment, SAN Advisor application 150-1 is embodied as software code such as data and/or logic instructions (e.g., code stored in the memory or on another computer readable medium such as a disk) supporting processing functionality according to different embodiments described herein.

During operation, processor 110 accesses memory system 115 via the interconnect 311 in order to launch, run, execute, interpret or otherwise perform the logic instructions of the SAN Advisor application 150-1. Execution of the SAN Advisor application 150-1 produces processing functionality in SAN Advisor process 150-2. In other words, the SAN Advisor process 150-2 represents one or more portions of the SAN Advisor application 150-1 performing within or upon the processor 110 in the computerized device 310. As discussed, one purpose of the SAN Advisor 150 (e.g., SAN Advisor application 150-1 and/or storage area network advisor process 150-2) is to identify records including parameter values identified in a respective query.

It should be noted that the SAN Advisor 150 executed on computer system 110 can be represented in FIG. 6 by either one or both of the SAN Advisor application 150-1 and/or the SAN Advisor process 150-2. For purposes of this discussion, general reference has been and will be made to the SAN Advisor 150 as performing or supporting the various steps and functional operations to carry out techniques discussed herein.

It should also be noted that example configurations herein include the SAN Advisor application 150-1 itself (i.e., the un-executed or non-performing logic instructions and/or data). The SAN Advisor application 150-1 may be stored on a computer readable medium (such as a floppy disk), hard disk, or optical medium. The SAN Advisor application 150-1 may also be stored in a memory system 312 such as in firmware, read only memory (ROM), or, as in this example, as executable code in, for example, Random Access Memory (RAM). In addition to these embodiments, it should also be noted that other embodiments herein include the execution of the SAN Advisor application 150-1 in processor 110 as the SAN Advisor process 150-2. Thus, those skilled in the art will understand that the computer system 310 may include other processes and/or software and hardware components, such as an operating system that facilitates carrying out management functions associated with the storage area network.

Figure 10:
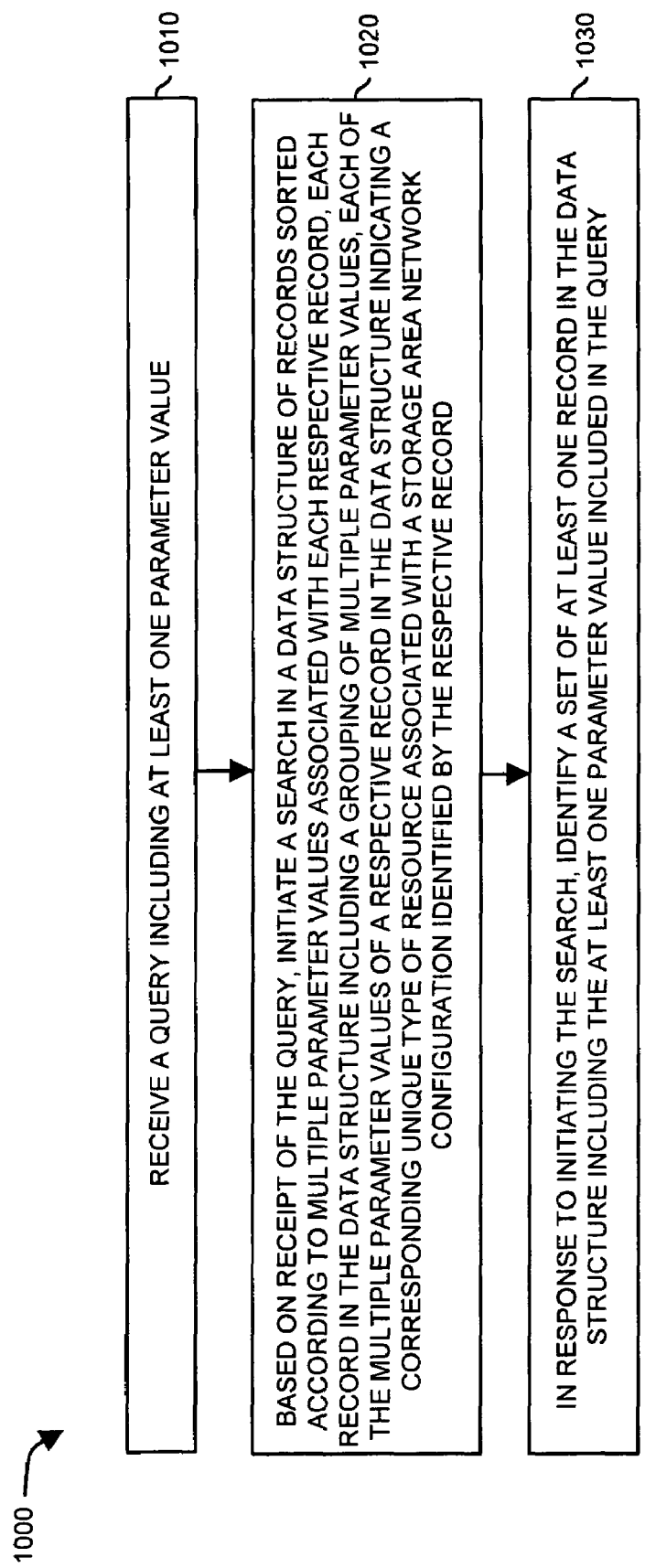
FIG. 10 is a flowchart illustrating a technique of initiating a search in a data structure to identify a compatible group of resources according to an embodiment herein.

FIG. 10 is a flowchart 1000 illustrating a technique of processing sets of records according to an embodiment herein. Note that the following discussion of flowchart 1000 overlaps with the concepts and techniques discussed above.

In step 1010, the SAN Advisor 150 receives a query 109 including at least one parameter value (e.g., at least one numerical identifier value).

In step 1010, based on receipt of the query 109, the SAN Advisor 150 initiates a search in a data structure of records in memory 115 sorted according to multiple parameter values associated with each respective record. Each record in the data structure of memory 115 includes a grouping of multiple parameter values (e.g., numerical identifier values). Each of the multiple parameter values of a respective record in memory 115 indicates a corresponding unique type of resource associated with a storage area network configuration identified by the respective record.

In step 1010, in response to initiating the search, the SAN Advisor 150 identifies a set of at least one record in memory 115 including the at least one parameter value included in the query 109.

Figure 11:
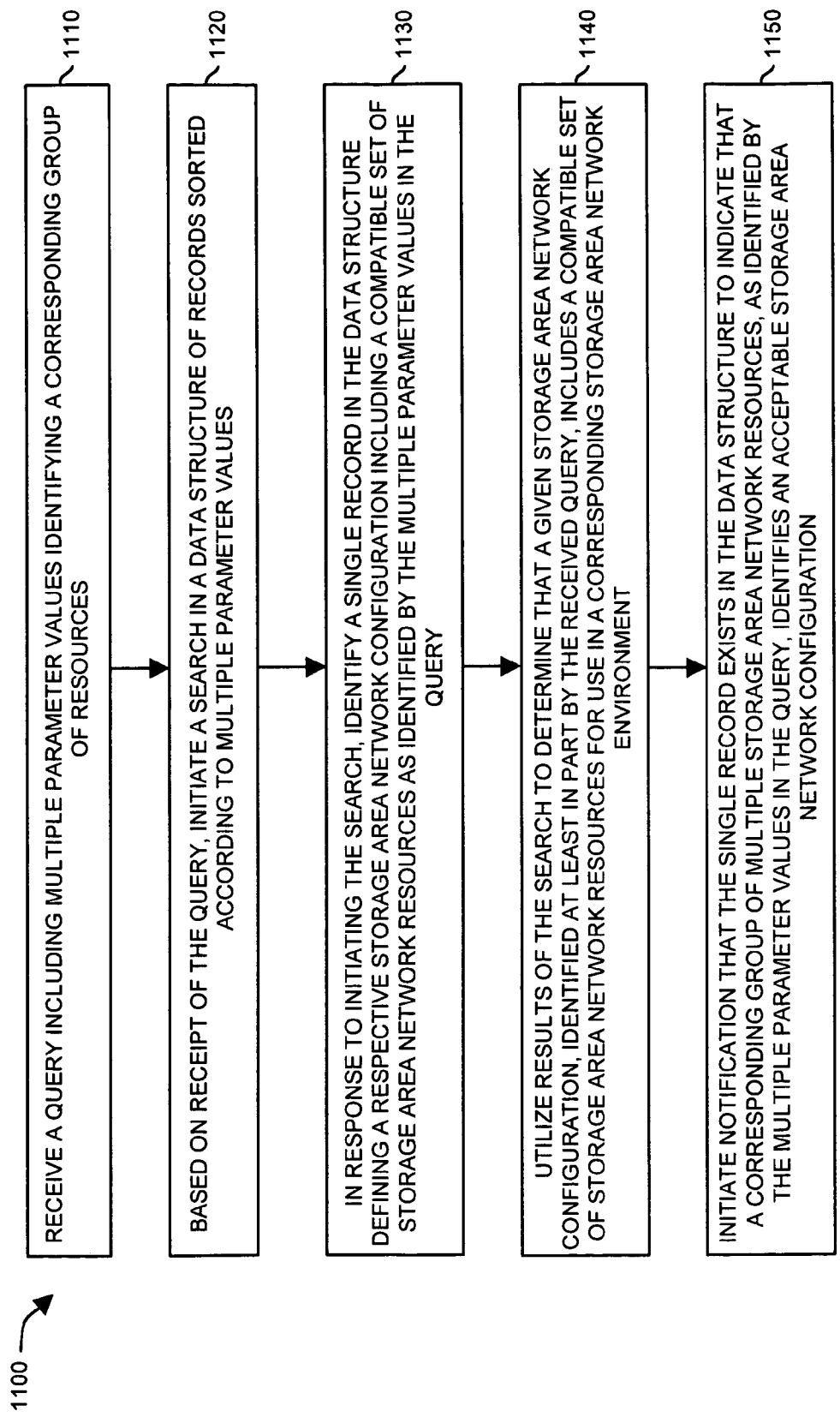
FIG. 11 is a more specific flowchart illustrating a technique of identifying whether a group of resources is compatible for use in a respective storage area network according to an embodiment herein.

FIG. 11 is a more detailed flowchart 1100 illustrating processing steps associated with the SAN Advisor 150 according to an embodiment herein.

In step 1110, the SAN Advisor 150 receives a query 109 including multiple parameter values identifying a corresponding group of resources.

In step 1120, based on receipt of the query, the SAN Advisor 150 initiates a search of records sorted according to multiple parameter values.

In step 1130, in response to initiating the search, the SAN Advisor 150 identifies a single record in memory defining a respective storage area network configuration including a compatible set of storage area network resources as identified by the multiple parameter values in the query 109.

In step 1140, the SAN Advisor 150 utilizes results of the search to determine that a given storage area network configuration, identified at least in part by the received query 109, includes a compatible set of storage area network resources for use in a corresponding storage area network environment.

In step 1150, the SAN Advisor 150 initiates notification that the single record exists in the data structure to indicate that a corresponding group of multiple storage area network resources, as identified by the multiple parameter values in the query, identifies an acceptable storage area network configuration.

Figure 12:
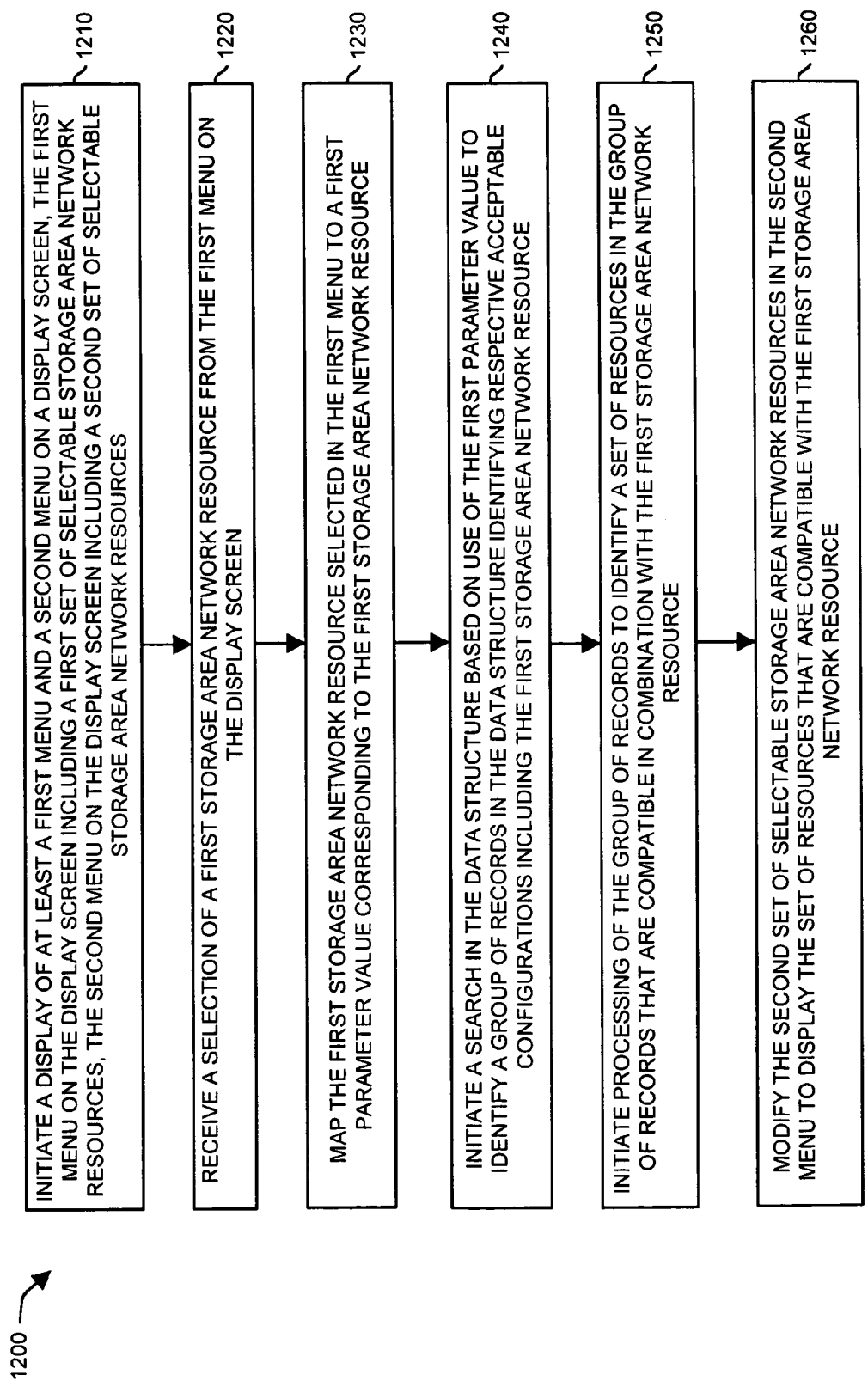
FIG. 12 is a flowchart illustrating a technique of populating menus with compatible resource information according to an embodiment herein.

FIG. 12 is a more detailed flowchart 1200 illustrating processing steps associated with the SAN Advisor 150 according to an embodiment herein.

In step 1210, the SAN Advisor 150 initiates a display of at least a first menu 640-1 and a second menu 640-2 on a display screen 130. The first menu 640-1 on the display screen 130 includes a first set of selectable storage area network resources. The second menu 640-2 on the display screen 130 includes a second set of selectable storage area network resources.

In step 1220, the SAN Advisor 150 receives a selection of a first storage area network resource from the first menu 640-1 on the display screen 130.

In step 1230, if necessary, the SAN Advisor 150 maps the first storage area network resource selected in the first menu 640 to a first parameter value (e.g., a numerical identifier value) corresponding to the first storage area network resource.

In step 1240, the SAN Advisor 150 initiates a search in the data structure of memory 115 based on use of the first parameter value to identify a group of records in the data structure identifying respective acceptable configurations including the first storage area network resource.

In step 1250, the SAN Advisor 150 initiates processing of the group of records to identify a set of resources in the group of records that are compatible in combination with the first storage area network resource.

In step 1260, the SAN Advisor 150 modifies the second set of selectable storage area network resources in the second menu 640-2 to display the set of resources that are compatible with the first storage area network resource. In one embodiment, this is achieved by providing an indication of which portion of the set of selectable resources in the second menu 640-2 can be selected for use in combination with the first storage area network resource selected from the first menu 640-1.

Figure 13:
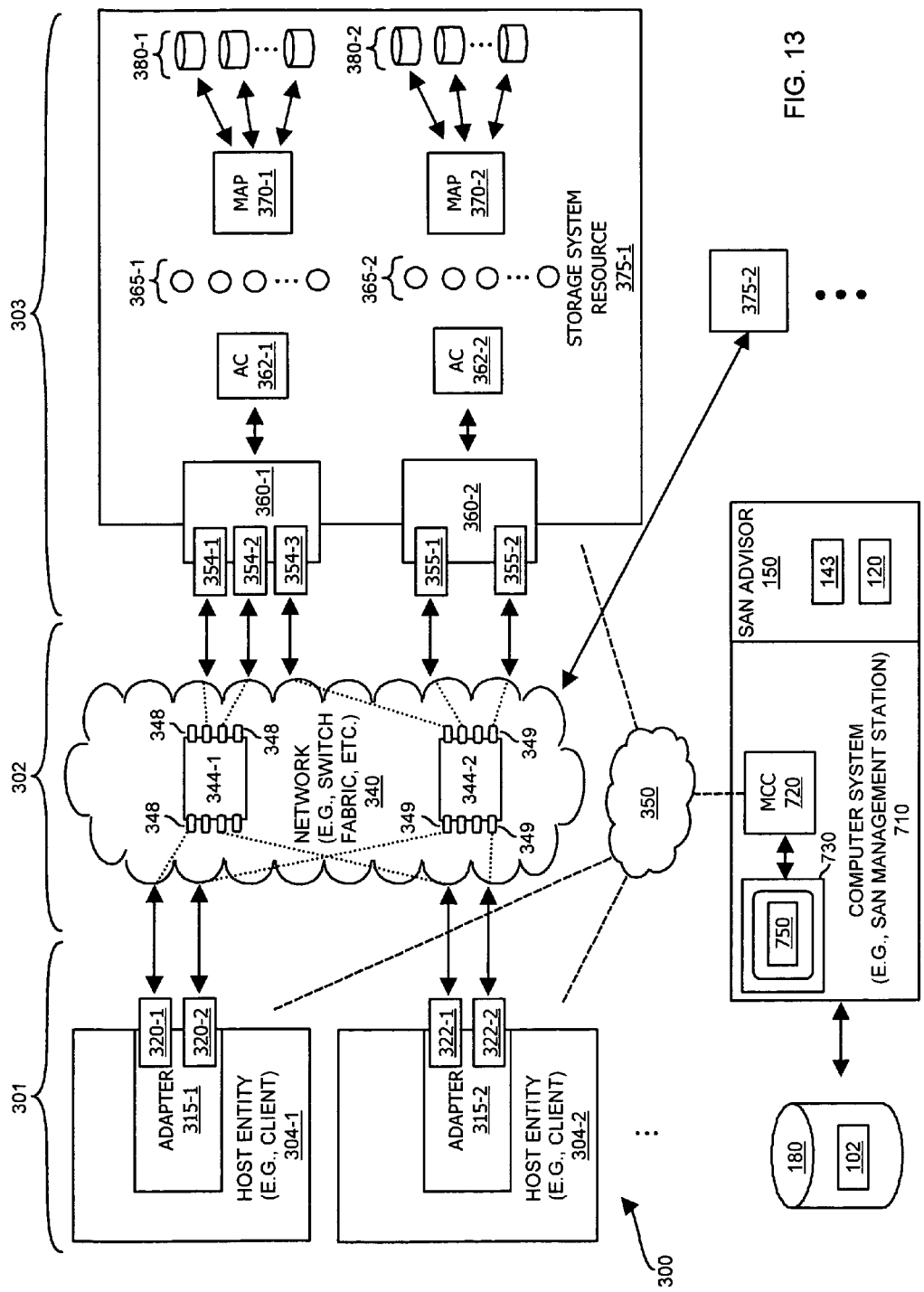
FIG. 13 is a diagram of a sample storage area network environment illustrating different types of resources for use in a storage area network according to an embodiment herein.

FIG. 13 is a block diagram more particularly illustrating connectivity of example network resources (e.g., host resources 301, switch resources 302, and storage resources 303) in a storage area network environment 300. As discussed above, the interoperability rules 102 are stored in repository 180. Records 120 utilized by the SAN Advisor 150 indicate different combinations of compatible resources that can be used in the storage area network environment 300. Management control center 720 enables a respective user to view and manage network configurations associated with storage area network environment 300 as well as utilize the storage area network advisor 150 to identify one or more combinations of compatible storage area network configurations. For example, a network administrator can query the storage area network advisor 150 (and records 120) as discussed above to quickly identify whether a current network configuration implemented in storage area network environment 300 or whether a theoretical model of resources is acceptable for use in the storage area network environment 300.

In one embodiment, the storage area network advisor 150 is a "bolt-on" with respect to the management control center 720. In such an instance, the management control center 720 interacts with the storage area network environment to collect data. However, in other embodiments, note that the storage area network advisor 150 can be configured to collect data directly from the storage area network environment as well.

As shown, storage area network environment 300 can include different types of resources. For example, storage area network environment 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 710, and repository 180. Network 340 includes switch device 344-1, switch device 344-2, and corresponding switch ports 348 and 349. Host entity 304-1 includes adapter 315-1. Adapter 315-1 has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

At a high level, FIG. 10 illustrates resources of a storage area network that potentially can be viewed and configured by a respective user via graphical user interface 750 supported by management control center 720. Graphical user interface 750 (whether local or remote with respect to computer system 710) facilitates viewing of resources (e.g., an inter-relationship of resources, connectivity of resources, topology of resources, details of resources, etc.) associated with storage area network environment 300 based on different viewing modes.

In terms of the resources as shown in FIG. 10, when properly configured, network 340 and related resources enable host entities 304 (e.g., servers, host computers, etc.) to access data in storage system resources 375 on behalf of respective clients that communicate through host entities 304. As an example, host entity 304-1 (e.g., a server) couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375.

Based on paths through these resources, host entities 304 access data from physical storage devices 380. For example, host entity 304-1 accesses data from physical storage devices 380 based on a connection path through adapter 315-1, port 320-1, switch 344-1, port 354-1, adapter 360-1 to storage system resource 375-1. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone. In general, a zone set defines a group of resources in the network providing a logical path between a host resource and a storage array resource.

As discussed, techniques herein are well suited for use in applications such as management of storage area networks.

However, it should be noted that techniques herein are not limited to use in such applications and thus configurations herein and deviations thereof are well suited for other applications as well. For example, techniques herein can be used to identify compatible groups of items While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for utilizing configuration information associated with a storage area network, the method comprising:

receiving a query including at least one parameter value;

based on receipt of the query, initiating a search in a data structure of records sorted according to multiple parameter values associated with each respective record, each record in the data structure including a grouping of multiple parameter values, each of the multiple parameter values of a respective record in the data structure indicating a corresponding unique type of resource associated with a storage area network configuration identified by the respective record;

in response to initiating the search, identifying a set of at least one record in the data structure including the at least one parameter value included in the query;

utilizing results of the search to determine whether a respective portion of a given storage area network configuration, as identified by the at least one parameter values in the query, is acceptable for use in a corresponding storage area network environment; and wherein initiating the search includes initiating a multi-dimensional search to identify whether the given storage area network configuration is acceptable for use in a respective storage area network environment, a first dimension of the multi-dimensional search being performed to identify which records in the data structure includes a first parameter of the at least one parameter in the query, a second dimension of the search being performed to identify which of the records including the first parameter also includes a second parameter value of the at least one parameter value in the query.

2. A method as in claim 1, wherein receiving the query includes receiving multiple parameter values, each of which specifies different resources in a proposed storage area network configuration in question; and wherein identifying the set of at least one record includes:
producing results for the search; and
identifying a single record in the data structure defining a respective storage area network configuration including a compatible set of storage area network resources as identified by the multiple parameter values in the query.

3. A method as in claim 2 further comprising:

verifying that the single record includes a matching set of parameter values for each of the multiple parameter values in the query; and initiating notification that the single record exists in the data structure to indicate that a corresponding group of multiple storage area network resources, as identified by the multiple parameter values in the query, identifies an acceptable storage area network configuration.

4. A method as in claim 1 further comprising:
mapping the first parameter value of the at least one parameter value into a third parameter value, the first parameter value identifying only a corresponding unique type of storage area network resource, the third parameter value identifying a range of different unique types of storage area network resources; and
wherein initiating the search includes initiating the search to identify whether the data structure includes any records including at least one of the first parameter value and the third parameter value.

5. A method as in claim 4 further comprising:
receiving the query in response to an entity inquiring whether a storage area network configuration including respective resources identified by the at least one parameter value is acceptable for use in a respective storage area network environment;
based on the search, identifying a matching record in the data structure including the third parameter value; and
notifying the entity that a respective storage area network configuration is acceptable based on identifying the matching record in the data structure corresponding to the query even though the matching record in the data structure does not include the first parameter value but does include the third parameter value.

6. A method as in claim 1 further comprising:
utilizing results of the search to determine whether a given storage area network configuration, identified at least in part by the received query, includes a compatible set of storage area network resources for use in a corresponding storage area network environment; and
producing an indication specifying whether the respective portion of the given storage area network configuration is acceptable.

7. A method as in claim 1 further comprising:
generating a diagram of the given storage area network configuration including corresponding storage area network resources; and
marking the diagram with indicators to identify at least one incompatible storage area network resource based on results of the search indicating that a combination of resources identified by the at least one parameter value in the query does not match any records of compatible configurations in the data structure.

8. A method as in claim 1 further comprising:
initiating a display of multiple menus on a respective display screen, each of the multiple menus displaying a corresponding set of selectable storage area network resources;
wherein receiving the query includes receiving a respective parameter value based on a corresponding selection from each of the multiple menus.

9. A method as in claim 1 further comprising:
initiating a display of at least a first menu and a second menu on a display screen, the first menu on the display screen including a first set of selectable storage area network resources, the second menu on the display screen including a second set of selectable storage area network resources;
wherein receiving the query includes receiving a selection of a first storage area network resource from a first menu on the display screen, the first parameter value of the at least one parameter values in the query identifying the first storage area network resource selected from the first menu; and initiating the search, at least in part, in response to receiving the selection of the first storage area network resource selected from the first menu.

10. A method as in claim 9 further comprising:
mapping the first storage area network resource selected in the first menu into the first parameter value corresponding to the first storage area network resource;
initiating the search in the data structure based on use of the first parameter value to identify a group of records in the data structure identifying respective acceptable configurations including the first storage area network resource;
initiating further processing of the group of records to identify a set of resources in the group of records that are compatible in combination with the first storage area network resource; and
modifying the second set of selectable storage area network resources in the second menu to display the set of resources that are compatible with the first storage area network resource.

11. A method as in claim 10, wherein modifying the second set of selectable storage area network resources displayed in the second menu includes providing an indication of which portion of the set of selectable resources in the second menu can be selected for use in combination with the first storage area network resource selected from the first menu.

12. A method as in claim 1, wherein identifying the set of at least one record in the data structure includes identifying a contiguous set of records in the data structure, each record in the contiguous set of records including at least one same parameter value identifying a corresponding unique type of storage area network resource.

13. A method as in claim 1, wherein initiating the search includes:
for the first parameter value of the at least one parameter value in the query, initiating a binary search to identify whether the data structure includes any records having a corresponding parameter value matching the first parameter value in the query; and
for the second parameter value of the at least one parameter value in the query, initiating a linear search with respect to a set of records including the first parameter value to identify whether the set of records includes any records having a corresponding parameter value matching the second parameter value in the query.

14. A method as in claim 1, wherein each record in the data structure specifies a grouping of known compatible storage area network resources, the method further comprising:
producing the results of the search based on the set of at least one record.

15. A method as in claim 1 further comprising:
wherein each record in the data structure specifies a grouping of known compatible storage area network resources;
for the first parameter value in the query, initiating a first search to identify a first set of records in the data structure that include a corresponding parameter value matching the first parameter value in the query;
for the second parameter value in the query, initiating a second search with respect to the first set of records to identify a subset of the first set of records that includes a corresponding parameter value matching the second parameter value in the query; and
providing notification regarding a compatibility of a configuration including a first resource type as specified by the first parameter value and a second resource type as specified by the second parameter value.

16. A method as in claim 1 further comprising:
displaying a first menu of selectable resource types;
displaying a second menu of selectable resource types;
wherein each record in the data structure specifies different groupings of compatible storage area network resource types;
wherein receiving the query includes receiving selection of a resource type displayed in the first menu;
wherein initiating the search includes searching the data structure for records including a parameter value specifying the resource type selected from the first menu;
processing a set of records including the parameter value specifying the selected resource type in the first menu to identify parameter values in the set of records specifying resources that are compatible with the resource type selected from the first menu; and
reducing a number selectable resource types in the second menu to include a list specifying the resources that are compatible with the resource type selected from the first menu.

17. A computer system for utilizing configuration information associated with a storage area network, the computer system comprising:
a processor;
memory unit that stores instructions associated with an application executed by the processor; and
an interconnect coupling the processor and the memory unit, enabling the computer system to execute the application and perform operations of:
receiving a query including at least one parameter value;
based on receipt of the query, initiating a search in a data structure of records sorted according to multiple parameter values associated with each respective record, each record in the data structure including a grouping of multiple parameter values, each of the multiple parameter values of a respective record in the data structure indicating a corresponding unique type of resource associated with a storage area network configuration identified by the respective record;
in response to initiating the search, identifying a set of at least one record in the data structure including the at least one parameter value included in the query; and
utilizing results of the search to determine whether a respective portion of a given storage area network configuration, as identified by the at least one parameter values in the query, is acceptable for use in a corresponding storage area network environment;
wherein initiating the search includes initiating a multi-dimensional search to identify whether a storage area network configuration is acceptable for use in a respective storage area network environment, a first dimension of the multi-dimensional search being performed to identify which records in the data structure includes a first parameter of the at least one parameter in the query, a second dimension of the search being performed to identify which of the records including the first parameter also includes a second parameter value of the at least one parameter value in the query.

18. A computer system as in claim 17 that additionally performs operations of:
mapping the first parameter value of the at least one parameter value into a third parameter value, the first parameter value identifying only a corresponding unique type of storage area network resource, the third parameter value identifying a range of different unique types of storage area network resources; and
wherein initiating the search includes initiating the search to identify whether the data structure includes any records including at least one of the first parameter value and the third parameter value.

19. A computer system as in claim 18 that additionally performs operations of:
receiving the query in response to an entity inquiring whether a storage area network configuration including respective resources identified by the at least one parameter value is acceptable for use in a respective storage area network environment;
based on the search, identifying a matching record in the data structure including the third parameter value; and
notifying the entity that a respective storage area network configuration is acceptable based on identifying the matching record in the data structure corresponding to the query even though the matching record in the data structure does not include the first parameter value but does include the third parameter value.

20. A computer system as in claim 17 that additionally performs operations of:
generating a diagram of the given storage area network configuration including corresponding storage area network resources; and
marking the diagram with indicators to identify at least one incompatible storage area network resource based on results of the search indicating that a combination of resources identified by the at least one parameter value in the query does not match any records of compatible configurations in the data structure.

21. A computer system as in claim 17 that additionally performs operations of:
initiating a display of at least a first menu and a second menu on a display screen, the first menu on the display screen including a first set of selectable storage area network resources, the second menu on the display screen including a second set of selectable storage area network resources;
wherein receiving the query includes receiving a selection of a first storage area network resource from a first menu on the display screen, the first parameter value of the at least one parameter values in the query identifying the first storage area network resource selected from the first menu; and
initiating the search, at least in part, in response to receiving the selection of the first storage area network resource selected from the first menu.

22. A computer system as in claim 21 that additionally performs operations of:
mapping the first storage area network resource selected in the first menu into the first parameter value corresponding to the first storage area network resource;
initiating the search in the data structure based on use of the first parameter value to identify a group of records in the data structure identifying respective acceptable configurations including the first storage area network resource;
initiating further processing of the group of records to identify a set of resources in the group of records that are compatible in combination with the first storage area network resource; and
modifying the second set of selectable storage area network resources in the second menu to display the set of resources that are compatible with the first storage area network resource.

23. A computer system as in claim 22, wherein modifying the second set of selectable storage area network resources displayed in the second menu includes providing an indication of which portion of the set of selectable resources in the second menu can be selected for use in combination with the first storage area network resource selected from the first menu.

24. A computer program product including a computer-readable medium having instructions stored thereon for processing data information, such that the instructions, when carried out by a processing device, enable the processing device to perform operations of:

receiving a query including at least one parameter value;

based on receipt of the query, initiating a search in a data structure of records sorted according to multiple parameter values associated with each respective record, each record in the data structure including a grouping of multiple parameter values, each of the multiple parameter values of a respective record in the data structure indicating a corresponding unique type of resource associated with a storage area network configuration identified by the respective record; and in response to initiating the search, identifying a set of at least one record in the data structure including the at least one parameter value included in the query;

utilizing results of the search to determine whether a respective portion of a given storage area network configuration, as identified by the at least one parameter values in the query, is acceptable for use in a corresponding storage area network environment; and wherein initiating the search includes initiating a multi-dimensional search to identify whether a storage area network configuration is acceptable for use in a respective storage area network environment, a first dimension of the multi-dimensional search being performed to identify which records in the data structure includes a first parameter of the at least one parameter in the query, a second dimension of the search being performed to identify which of the records including the first parameter also includes a second parameter value of the at least one parameter value in the query.

* * * * *